(12) United States Patent
Peretz

(10) Patent No.: US 9,146,830 B2
(45) Date of Patent: Sep. 29, 2015

(54) HYBRID LOCAL/REMOTE INFRASTRUCTURE FOR DATA PROCESSING WITH LIGHTWEIGHT SETUP, POWERFUL DEBUGGABILITY, CONTROLLABILITY, INTEGRATION, AND PRODUCTIVITY FEATURES

(71) Applicant: JSMapreduce Corporation, Redmond, WA (US)

(72) Inventor: Ervin Peretz, Redmond, WA (US)

(73) Assignee: JSMapreduce Corporation, Redmond, WA (US)

( * ) Notice: Subject to any disclaimer, the term of this patent is extended or adjusted under 35 U.S.C. 154(b) by 119 days.

(21) Appl. No.: 14/055,820

(22) Filed: Oct. 16, 2013

(65) Prior Publication Data
US 2014/0123115 A1    May 1, 2014

Related U.S. Application Data

(60) Provisional application No. 61/719,288, filed on Oct. 26, 2012.

(51) Int. Cl.
*G06F 17/30* (2006.01)
*G06F 11/36* (2006.01)
*G06F 9/50* (2006.01)
*G06F 9/45* (2006.01)

(52) U.S. Cl.
CPC ............... *G06F 11/362* (2013.01); *G06F 8/52* (2013.01); *G06F 9/5066* (2013.01)

(58) Field of Classification Search
CPC ......... H04L 67/10; H04L 67/16; H04L 41/12; H04L 41/509; G06F 11/362; G06F 8/52; G06F 9/5066
See application file for complete search history.

(56) References Cited

U.S. PATENT DOCUMENTS

| | | | | |
|---|---|---|---|---|
| 7,650,331 B1 * | 1/2010 | Dean et al. | | 712/203 |
| 8,209,274 B1 * | 6/2012 | Lin et al. | | 706/21 |
| 8,321,454 B2 * | 11/2012 | Berlyant et al. | | 707/770 |
| 8,560,605 B1 * | 10/2013 | Gyongyi | | 709/204 |
| 8,572,575 B2 * | 10/2013 | Berlyant et al. | | 717/126 |
| 8,612,510 B2 * | 12/2013 | Dean et al. | | 709/201 |
| 8,799,916 B2 * | 8/2014 | Cherkasova et al. | | 718/104 |
| 8,887,156 B2 * | 11/2014 | Chambers et al. | | 718/1 |
| 8,959,499 B2 * | 2/2015 | Chambers et al. | | |

(Continued)

OTHER PUBLICATIONS

Dhiman et al., Google's Go and Dart: parallelism and structured web development for better analytics and applications, Nov. 2012, 2 pages.*

(Continued)

*Primary Examiner* — Thuy Dao
(74) *Attorney, Agent, or Firm* — Perkins Coie LLP

(57) ABSTRACT

The technology provides a hybrid local/remote hosted MapReduce framework and infrastructure comprising systems and methods for improving setup, configuration, controllability, debuggability, and integration of a compute job and systems and methods for increasing programmer productivity. The system applies an interpreted programming language for the programmer's custom Map and Reduce algorithms, such that those algorithms can execute identically on both the hosted service as well as locally (e.g., on the programmer's local computing system or device) for development and debugging purposes. Furthermore, the system delivers this service—a hosted MapReduce infrastructure—in a simple and transparent web service.

14 Claims, 6 Drawing Sheets

(56) References Cited

U.S. PATENT DOCUMENTS

| | | | |
|---|---|---|---|
| 8,959,519 B2* | 2/2015 | Agarwal et al. | 718/102 |
| 2012/0254193 A1* | 10/2012 | Chattopadhyay et al. | 707/747 |
| 2013/0036149 A1* | 2/2013 | Kosuru et al. | 709/201 |
| 2013/0086355 A1* | 4/2013 | Narang et al. | 712/30 |
| 2015/0006619 A1* | 1/2015 | Banadaki et al. | 709/203 |

OTHER PUBLICATIONS

Ahmad et al., Tarazu: optimizing MapReduce on heterogeneous clusters, Apr. 2012, 14 pages.*

Sehrish et al., MRAP: a novel MapReduce-based framework to support HPC analytics applications with access patterns, Jun. 2010, 12 pages.*

* cited by examiner

HYBRID LOCAL/REMOTE INFRASTRUCTURE FOR DATA PROCESSING WITH LIGHTWEIGHT SETUP, POWERFUL DEBUGGABILITY, CONTROLLABILITY, INTEGRATION, AND PRODUCTIVITY FEATURES

REFERENCES TO RELATED APPLICATIONS

This application claims priority to U.S. Provisional Patent Application No. 61/719,288, entitled "HYBRID LOCAL/REMOTE MAPREDUCE INFRASTRUCTURE FOR BIG DATA PROCESSING WITH LIGHTWEIGHT SETUP, POWERFUL DEBUGGABILITY, AND NOVEL CONTROLLABILITY, INTEGRATION, AND PRODUCTIVITY FEATURES," filed Oct. 26, 2012, which is hereby incorporated by reference in its entirety.

TECHNICAL FIELD

The disclosed subject matter relates to distributed compute tasks over large volumes of data, such that many computers are used to process the data because a single computer could not in a reasonable period of time process the data, or even read in the data on its network link, or both.

BACKGROUND

MapReduce is a programming model and an associated implementation for processing and generating large data sets and which is applicable to a broad class of compute tasks. A map function processes input data to generate sets of intermediate key/value pairs and a reduce function that merges all intermediate values associated with the same intermediate key. There are also multiple MapReduce infrastructures that implement the MapReduce framework. Some of the infrastructures are self-deployed, requiring the user to own the vast number of computers required; but most new implementations are hosted, such that the computational resources are borrowed via a web service for the time span of the compute job.

MapReduce is being applied to an increasing range of "big data" analysis tasks in fields involving web traffic, advertising, financial data, medical research, census data, etc.

In the MapReduce paradigm, the user supplies computer code for two simple algorithms—Map and Reduce—that are specific to the compute task. The MapReduce infrastructure then deploys the custom Map and Reduce algorithms on a large number (e.g., thousands) of machines, monitoring them to completion and restarting as needed, and delivering, sorting, and collecting input/output data from the machines as required by the typical MapReduce paradigm.

The compute job is said to be "sharded," with "shards" (portions) of data being fed to compute shards (machines) (e.g., computer systems or devices) executing multiple instances of the custom Map and Reduce algorithms).

A MapReduce infrastructure allows the programmer to accomplish the custom compute task by programming the custom and relatively simple Map and Reduce algorithms, without needing to manage the execution and coordination of the large number of required computers.

The MapReduce framework is described by Jeff Dean and Sanjay Ghemawat in their paper titled "MapReduce: Simplified Data Processing on Large Clusters" (published in OSDI'04: Sixth Symposium on Operating System Design and Implementation, San Francisco, Calif., December 2004), which is available at research.google.com/archive/mapreduce.html and which is hereby incorporated by reference in its entirety. The Apache Software Foundation developed and offers an open-source MapReduce implementation called Hadoop.

Today, several hosted MapReduce services exist as businesses. The most prominent is Amazon Web Service's Elastic MapReduce (Amazon EMR), which offers Hadoop within its hosted compute service. Information regarding Amazon EMR can be found at the following URL: aws.amazon.com/elasticmapreduce/.

Other hosting companies with large data centers, such as Google of Mountain View, Calif. and Microsoft of Redmond, Wash., are offering their own hosted MapReduce solutions.

MapR Technologies, Inc. of San Jose, Calif. offers a hosted Hadoop infrastructure on Google's compute engine (www.mapr.com/).

Hadapt, Inc. of Cambridge, Mass. offers a hosted Hadoop infrastructure and connects it to a relational database model (www.hadapt.com).

Datameer, Inc. of San Mateo, Calif. is another Hadoop integrator (www.datameer.com/).

There also exist some interpreted and/or in-browser MapReduce implementations, but these are mostly demonstration or teaching tools. Unlike the described disclosed system, these are not backed by an actual scaled MapReduce infrastructure that can be applied to high-volume compute jobs or to managing or debugging those jobs. An example is mapreduce-js, described as an "educational framework" (code.google.com/p/mapreduce-js/).

DETAILED DESCRIPTION

Figure 1:
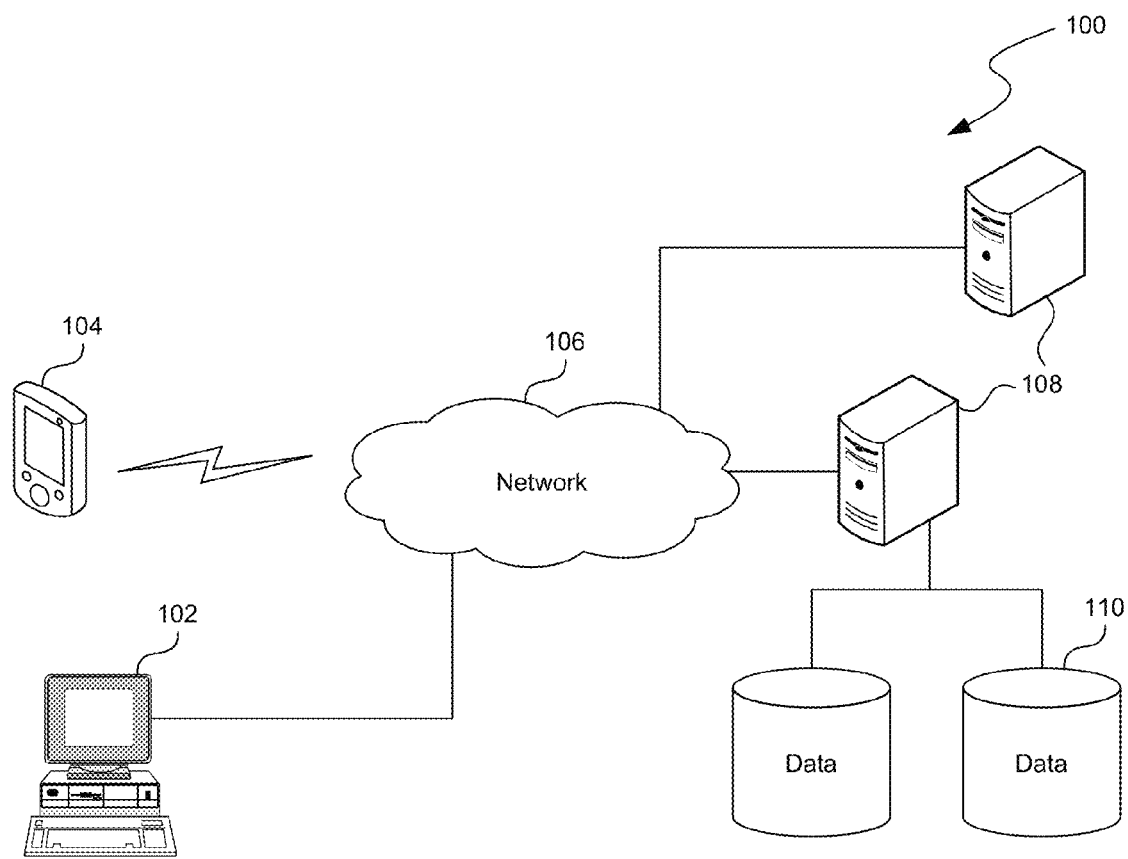
FIG. 1 is a system diagram illustrating a computer network architecture in accordance with some embodiments of the disclosed technology.

The disclosed technology provides a hybrid local/remote hosted MapReduce framework and infrastructure comprising systems and methods for improving setup, configuration, controllability, debuggability, and integration of a compute job and systems and methods for increasing programmer productivity. The system applies an interpreted programming language for the programmer's custom Map and Reduce algorithms, such that those algorithms can execute identically both remotely (on the hosted service) and locally (e.g., on the programmer's local computing system or device) for development and debugging purposes. Furthermore, the disclosed system delivers this service—a hosted MapReduce infrastructure—in a simple and transparent web service that does not depend on the installation of any programs or programming tools or compilation of any computer code.

Debuggability

Several aspects of the disclosed system relate to debuggability. A persistent difficulty in MapReduce development is that each compute job is executing on many remote computers. If a compute "shard" (process executing a Map or Reduce instance) should fail, it can be difficult to 1) figure out which one failed, and for which input and 2) reproduce the execution of the failed shard with identical input data on the programmer's local computer, where it can be debugged.

The disclosed system solves these problems by identifying the failing shard within the web service and allowing the programmer to import the failing shard's input data into the programmer's web browser where the input data can be observed and single-stepped as it is processed by the Map or Reduce program. Thus, the disclosed system provides a technique for quickly and easily identifying the program bug (or data corruption) causing the compute job to fail.

In addition, the disclosed system introduces several novel aspects to hosted MapReduce infrastructure. In particular, the disclosed system includes a Kernel program to generate input data for the MapReduce job. Very often, the input (seed) data for a MapReduce job is very large and is therefore difficult/costly/lengthy to upload to the hosted MapReduce infrastructure. However, for many classes of problems, the large set of input data can be generated from a small program, which we call a "Kernel" program. An example is poker analysis, where the number of all possible poker hands is very large and such input data would consume many megabytes. However, a tiny Kernel program of, for example, under 1 kilobyte can generate a representation of all possible poker hands. The disclosed system allows for seeding the MapReduce job with input data from a Kernel program, rather than literal data.

Performance

Additional aspects of the disclosed system relate to performance of the MapReduce job execution. Standard implementations of a MapReduce infrastructure involve a lengthy and computationally expensive "Shuffle" phase between the "Map" and "Reduce" phases of the overall MapReduce job. As discussed in further detail below, the disclosed system includes a novel data sorting algorithm implemented by, for example, the system's supervisor component for each Map instance. In some embodiments, this sorting algorithm eliminates the "Shuffle" phase associated with standard MapReduce implementations.

The disclosed system provides for the execution of user-provided code, such as JavaScript or Python code, implementing Mapper( ) Reducer( ) and optionally Kernel( ) functions. In the disclosed implementation, these codes may be input via a web browser or other input mechanism.

In some embodiments, the user-provided JavaScript or Python code is initially evaluated in the user's browser environment. In some embodiments, the code is tested for syntactic correctness, executed in-browser against a small set of sample input data, and debugged and corrected as needed.

Once proven in the browser environment, the user-provided code is transported to the service's hosting environment. The user specifies a source of input data, which may be a large online data store (possibly holding terabytes of input data), or a Kernel function that generates the input data. The user-provided code is then loaded onto many computers, which each implement one or more Map or Reduce processes on behalf of the job.

As discussed in further detail below, Map and Reduce processes are able to interpret the user-provided JavaScript and Python algorithms and apply them to the input data. Thus, in some embodiments, the executed program is specific to the user-provided algorithm, but the scaling to many machines is done by the hosting service. Furthermore, the execution of each Map or Reduce shard is executed in the same manner as 1) it would be executed within the user's browser and 2) it could be re-executed within the user's browser should that shard require debugging.

While each Map or Reduce shard executes, the shard aggregates its consumption of compute resources (e.g., compute cycles, storage, and networking), and reports them to a controlling process for the compute job. Each shard also reports its progress and health status to the job controller. Furthermore, the job controller may be regularly polled from the user's browser, and it reports up-to-date aggregate cost for the job and status on the overall job as well as the status of each Map and Reduce shard.

The hosted MapReduce system described herein offers advantages over typical MapReduce systems. For example, the disclosed system can be implemented as an entirely hosted service, with no installable client (local) software or SDK (software development kit) and without compiling any MapReduce computer code locally. Various embodiments of the disclosed technology offer additional advantages, including, for example:

Complete portability with respect to the programmer's development machine and operating system, since there is no required (potentially platform-specific) client software, SDK, or compiler.

Easy and highly iterative development and testing within the programmer's web browser.

Lower cost development, since in-browser testing does not consume charged computer resources by the hosting service.

Continuous resource metering, progress reporting, and cost transparency relating to the remote compute job.

Ability to monitor data and logging on each compute "shard" (Map or Reduce instance) while the job is running.

Ability to debug any particular compute "shard" by automatically fetching its execution environment and replicating it in the programmer's browser, where it can be single-stepped, observed, and analyzed.

Ability to use a Kernel program to generate seed input data for the MapReduce job, rather than upload the input data.

Ability to pause a distributed compute job and to later resume the distributed compute job.

Elimination of the costly and time-consuming "Shuffle" phase of the MapReduce job through a novel data-sorting algorithm during the Map phase.

The same hybrid local/remote hosted MapReduce paradigm implemented for user JavaScript code (via in-browser execution when executing locally) can be implemented for Python code (for which there is no native in-browser execution environment for typical browsers), through proxying to a secure "sandbox" execution environment on the front-end server. Python is more suited for data mining, numeric research, and machine learning compute tasks. In the disclosed implementation, the in-browser single-stepping and execution paradigm is accomplished by remoting [user code and text I/O to/from] a Python execution environment on the server for inspection and single-stepping within the browser. One of ordinary skill in the art will recognize that this remoting paradigm may further extend to other languages besides Python—including both interpreted and compiled languages—by remoting the interpretation and/or compilation and execution of the user code to the system's front-end server.

Extension of the model of a transparently executing hosted MapReduce job to define data pipelines involving multiple such jobs. Many real-world "big data" compute tasks are voluminous or complex to a degree that requires multiple MapReduce jobs. Such a data pipeline, once defined, could be executed as a single multi-part job.

Providing ready-made data sources and compute stages (developed by the hosting company itself, by another user of the service, or by a third party) for such data pipelines. Many data mining jobs involve common data sources, many of which are publicly available: such as, stock market data or census data. The service could easily package and provide these data sources in a format that is immediately compatible with the MapReduce paradigm and is pre-uploaded to the hosting service.

Extension of the model further by exposing a graphical programming environment for such data pipelines. Such a graphical programming environment has precedent in the field of instrumentation, as implemented in LabVIEW (from National Instruments Corporation). LabVIEW is used to graphically construct multi-stage data processing tasks where the stages are compute steps over data from physical lab instruments. LabVIEW's graphical programming language is called "G" and allows for parallel pipelines within the overall graphical program. This graphical programming paradigm, including parallelism between serial portions of the program, may be adapted to the disclosed system—substituting MapReduce (or similar) data processing stages and packaged data sources for the lab instruments.

In-Browser Execution Environment

Figure 6:
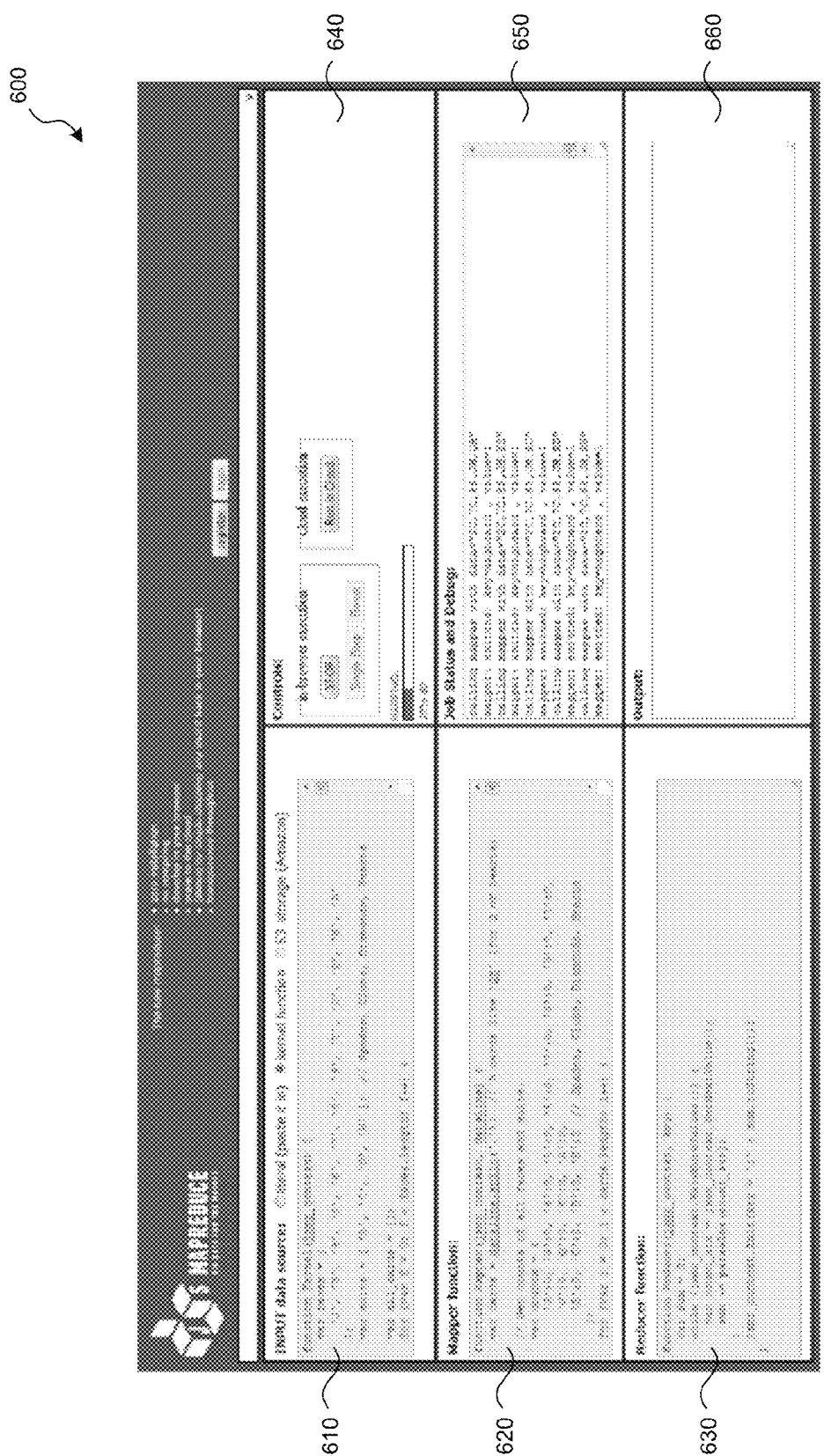
FIG. 6 is a display page illustrating a User Interface with Local MapReduce Development and Debugging Interface in accordance with some embodiments of the disclosed technology.

In some embodiments, the user-provided code (e.g., Mapper( ) Reducer( ) and Kernel( ) functions) is pasted into designated areas of the user interface within the browser (see FIG. 6). It is initially evaluated within the browser. For example, JavaScript functions can be analyzed by the standard JavaScript eval( ) function to evaluate the text of user-provided JavaScript code to, for example, check it for syntactic correctness. That system JavaScript code can then invoke the user-provided JavaScript code. If there is a user-provided Kernel( ) function, the Kernel( ) function is invoked first to generate the input data for the MapReduce job. Otherwise, the input data is obtained from, for example, a web storage service designated by the user, literal test data pasted into the browser by the user, etc. For Python (which has no built-in support within a typical browser), each evaluation step is remoted to the system's front-end server.

After obtaining the input data for the MapReduce job, the in-browser execution environment (implemented as JavaScript) executes the Map phase. It invokes the user-provided Mapper( ) JavaScript or Python function against each record in the input data. The user's Mapper( ) implementation may "emit" one or more outputs for each input data record, in the form of a key-value pair, as dictated by the MapReduce paradigm. The key and value in each emitted key-value pair is entirely specific to the user's compute job; they may be strings or integers, or stringized structures that are serialized by some standard such as JavaScript Object Notation (JSON). These key-value pairs are collected by the in-browser execution engine, without interpretation.

After the Map phase is complete, the in-browser execution environment sorts all the emitted key-value pairs by unique key. It then begins the Reduce phase. In the Reduce phase, each unique key and the set of values associated with it are passed together to the user-provided Reducer( ) JavaScript or Python function, one unique key (and its associated values) at a time. The user's Reducer( ) function then performs the job-specific Reduce function on the values (a simple example would be to sum the values) and may "emit" one or more output values. The in-browser execution environment collects all the Reducer( ) outputs and delivers them as output of the overall MapReduce job.

The in-browser execution of the MapReduce job is serial and therefore not particularly efficient. However, it simulates the "real" hosted MapReduce job's Map and Reduce steps, which are highly parallelizable.

Hosted Execution Environment

In some embodiments, once the user's code is validated in the in-browser execution environment, the user may deploy it to the hosted service. The user-provided JavaScript or Python code, for example, is encoded as base64, transported to the service's hosting environment via HTTP, and decoded back to cleartext.

The user specifies a source of input data, which may be a large online data store (possibly holding terabytes of input data), or a Kernel function, which generates the input data. The user-provided JavaScript or Python code is then loaded onto many computers, which each implement one or more Map or Reduce processes on behalf of the job.

Each Map or Reduce process (as well as the Kernel-executing process) includes a JavaScript interpreter program (similar to those found in web browsers) to execute the user-provided JavaScript programs, as well as a function that supervises the execution of the user-provided JavaScript function within the interpreter. Therefore, each Map or Reduce process (as well as the Kernel-executing process) is able to execute user-provided JavaScript code, and catch any crashes or anomalies, including infinite looping, by the executing JavaScript code. The supervising function is able to terminate the JavaScript execution at any point, should it misbehave. Likewise, each Map or Reduce process (as well as the Kernel-executing process) implemented in Python includes a Python sandboxing system, allowing user-provided Python code to be safely executed on the system, and catch crashes or anomalies in its execution.

Furthermore, the supervising function is able to meter the resource consumption and progress of the JavaScript or Python execution and to report these to the job controller for aggregation.

The Map and Reduce functions can be executed as interpreted code, which is not as fast as the compiled code applied by other MapReduce infrastructures. However, with extreme "sharding" of the job (i.e., applying many—e.g., hundreds, thousands, hundreds of thousands, and so on—Map and Reduce processes), the disclosed system is able to neutralize performance loss from the use of interpreted code, while retaining the simplicity and debuggability advantages of using interpreted code that runs identically in both the hosted environment and the browser.

During the Map phase, multiple Map processes interpret the user-provided Mapper( ) JavaScript or Python, for example, function against shards of input data. To eliminate the need for the user to specify a custom data record separator (input feeder) program, the infrastructure can make the simplifying assumption that all input data is newline-separated.

The system collects Mapper( )-emitted key-value pairs. In order to eliminate the "Shuffle" phase, the supervising code in the Map function outputs the key-value pairs according to a convention that makes them immediately collectable by the Reduce processes during the Reduce phase. That convention is as follows:

Elimination of the Shuffle Phase

The key-value pairs are to be grouped by unique key for the Reduce phase. This is traditionally the job of the Shuffle phase. In order to eliminate the Shuffle phase, each Map process individually pre-groups its key-value outputs by key. Since the keys may be large (e.g., serialized JSON records), it converts each key to a fixed-size (40-byte) hash value, which is unique to the actual key with astronomically high probability.

Assuming two Map processes, which we will call mapper_1 and mapper_2, which emit the same two keys, key1 and key2, . . . mapper_1 may output its collected key-value pairs to shared storage in folders and files named as follows:

```
.../job_78/all_key_data/
   keyhash_61afba749434aa1c2f0113d599d2296ea625685f/
   from_mapper_1
.../job_78/all_key_data/
   keyhash_c8d5742263dc602aa8142f20619d394c5bf912f0/
   from_mapper_1
```

. . . while mapper_2 may output its collected key-value pairs for the same keys to the same shared storage in folders and files named as follows:

```
.../job_78/all_key_data/
   keyhash_61afba749434aa1c2f0113d599d2296ea625685f/
   from_mapper_2
.../job_78/all_key_data/
   keyhash_c8d5742263dc602aa8142f20619d394c5bf912f0/
   from_mapper_2
```

. . . .

. . . where "61afba749434aa1c2f0113d599d2296ea625685f" is the SHA-1 hash value for key1, and "c8d5742263dc602aa8142f20619d394c5bf912f0" is the SHA-1 hash value for key2.

The multiple mappers are therefore able to write their output key-value pairs (the contents of the above-named files) to shared storage with no coordination,—simply by following this convention.

Furthermore, in the Reduce phase, all key-value pairs with the same unique key value are found under the same directory. For example, in the above example, all the key-value pairs with key=key1 would be found in the files:

```
.../job_78/all_key_data/
   keyhash_61afba749434aa1c2f0113d599d2296ea625685f/
   from_mapper_1
.../job_78/all_key_data/
   keyhash_61afba749434aa1c2f0113d599d2296ea625685f/
   from_mapper_2
```

. . . .

because "61afba749434aa1c2f0113d599d2296ea625685f" is the SHA-1 hash value for key1. The Reduce processes also need to be able to obtain the actual keys (not just their hashes). Since hash values are not reversible, the Map processes facilitate this need by also writing reverse-lookup files for the emitted keys to map keys to corresponding hash values. For the above example, those reverse-lookup files would be:

| | |
|---|---|
| .../job_78/all_key_hashes/<br>61afba749434aa1c2f0113d599d2296ea625685f | (content is: "key1") |
| .../job_78/all_key_hashes/<br>c8d5742263dc602aa8142f20619d394c5bf912f0 | (content is: "key2") |

. . . .

Each of these small reverse-lookup files contains the cleartext key that it represents (i.e., whose hash value is its filename). Each one may be written multiple times, once by each mapper that emits that key. However, the writes are atomic writes, so these writes also require no coordination between the Map processes.

Note also that, in the above example, the number of unique keys to be processed by the Reduce phase is simply the number of files under . . . /job_78/all_key_hashes/. The job controller also knows the total volume of Map phase-emitted data from the resource and progress metering described above. The Map phase's output data is the Reduce phase's input data. By knowing both the volume of input data and the number of unique keys for the Reduce phase, the job controller is able to intelligently and dynamically assign an appropriate number of Reduce processes (compute shards) for the job.

Pause/Resume

Since each Mapper( ) and Reducer( ) computation is small relative to the overall job, and its output is written to storage (e.g., a shared storage), a MapReduce job run under the described implementation can be paused and later resumed, with very little redundant work. In fact, the compute resources (machines executing Map and Reduce processes) can be given back to the idle work pool while a job is paused. The only resource consumed by a paused job is the shared storage holding the input and partial output of its interrupted phase.

While a job is paused, the user may:
  inspect output or logging from a suspect Map or Reduce shard;
  debug a Map or Reduce shard, by executing it locally within the browser;
  update or tune the Mapper or Reducer code; or
  purchase more credits so as to not overrun his account balance.

In addition to Pause/Resume, a user may of course also terminate the job.

Inspectability

Partial Map or Reduce output, as well as logging by that shard, may be inspected at any time, even while the job is running. At the user's selection, the client-side system JavaScript simply requests the contents of the appropriate transitional output file from storage. Log data that is specific to a shard is fetched from the database.

Debuggability

Debugging a specific Map or Reduce shard includes simply retrieving the Mapper( ) or Reducer( ) code for the job, along with the input data for the particular shard, and locally (e.g., in the browser) reapplying the retrieved code to the retrieved input data. A Map or Reduce process's supervisor function is able to detect any failure or too-long execution (e.g., infinite looping) by the shard's hosted (service-side) JavaScript or Python execution. The failure is then indicated to the user (identifying the specific shard), who may then opt to retrieve the shard's code and input data into the browser, where it can be executed for debugging as described in the In-Browser Execution Environment section above.

FIG. 1 is a block diagram of an environment 100 in which the MapReduce system operates. The environment 100 includes various computing devices, such as a computer 102 and a mobile device 104. Each of the computing devices is capable of communicating through a network 106. The network 106 may be any type of public or private connection suitable for transporting data between nodes. In some embodiments, the Internet is used to provide the connection, but other connections may also be used. For example, the systems could be connected through a dialup phone line, a dedicated line, or a terrestrial or satellite wireless network.

The computing devices 102 and 104 communicate with multiple servers 108. The servers 108 implement the MapReduce algorithms discussed herein. The servers 108 may communicate with a data storage component 110, such as a database. The data storage component 110 may store executable code and data necessary to execute the functionality described below.

In some embodiments, the computing devices 102 and 104 communicate with the servers 108 using a HyperText Transport Protocol (HTTP) session. For example, the computing devices 102 and 104 may include a web browser or similar application capable of sending messages through the network 106 and, in some cases, encrypting those messages. The servers 108 may implement a web server capable of receiving and processing sessions (e.g., HTTP sessions) from multiple computing devices.

Figure 2:
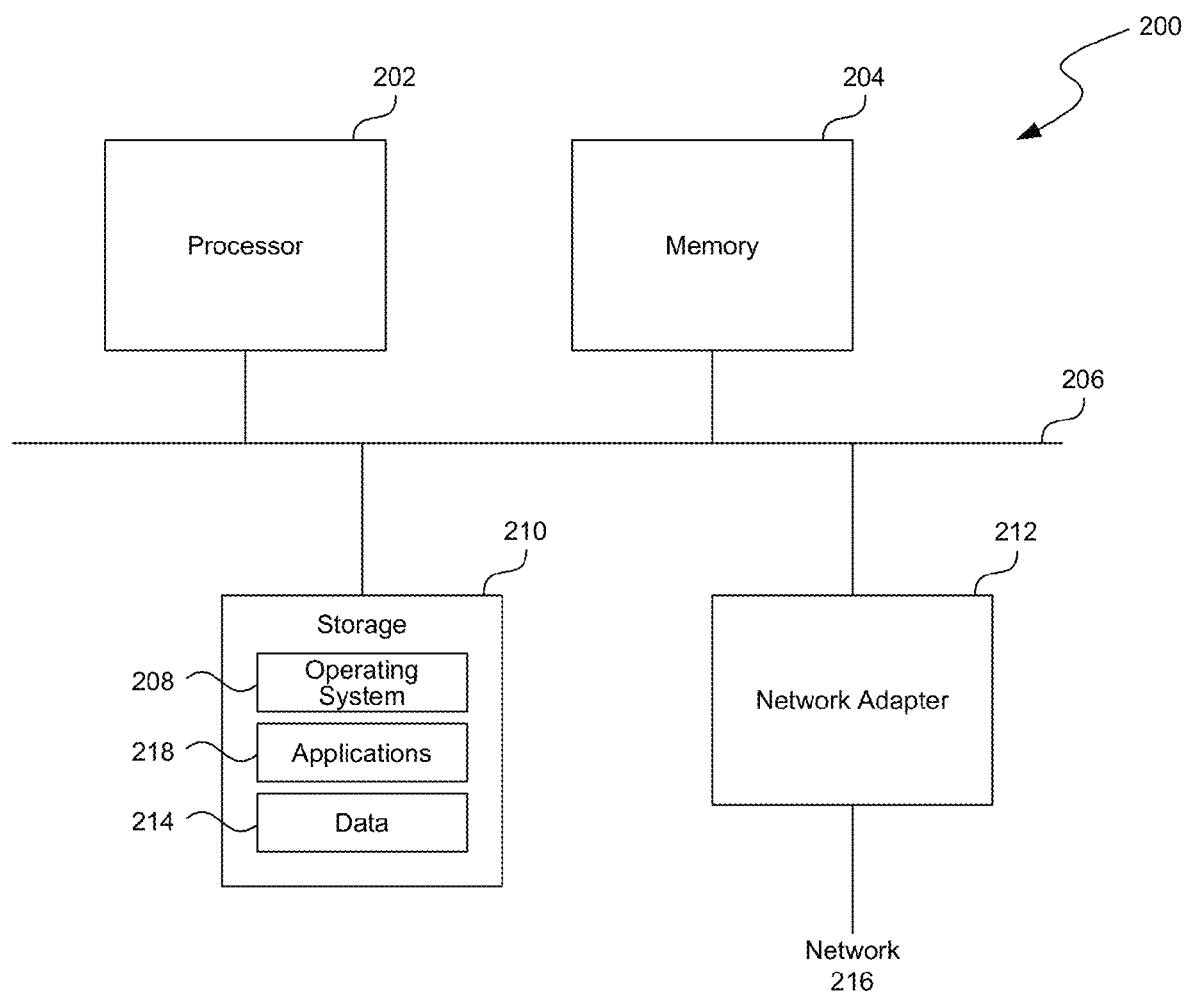
FIG. 2 is a system diagram illustrating a computer architecture in accordance with some embodiments of the disclosed technology.

FIG. 2 is a high-level block diagram showing an example of the architecture of a server 200. The server 200 may correspond to the servers 108 depicted in FIG. 1. The server 200 includes one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1294 bus, sometimes referred to as "Firewire."

The processor(s) 202 may include central processing units (CPUs) of the server 200 and, thus, control the overall operation of the server 200 by executing software or firmware. The processor(s) 202 may be, or may include, one or more programmable general-purpose or special-purpose microprocessors, digital signal processors (DSPs), programmable controllers, application-specific integrated circuits (ASICs), programmable logic devices (PLDs), or the like, or a combination of such devices. The memory 204 represents any form of random access memory (RAM), read-only memory (ROM), flash memory, or the like, or a combination of such devices. The functions or algorithms described herein are implemented in hardware, and/or software in embodiments. The software comprises computer-executable instructions on computer-readable media. Non-transitory computer-readable media include tangible media such as hard drives, CD-ROMs, DVD-ROMS, and memories such as ROM, RAM, and Compact Flash memories that can store instructions and other storage media. Signals on a carrier wave such as an optical or electrical carrier wave are examples of transitory computer-readable media that are not storage media. Further, such functions correspond to modules, which are software, hardware, firmware, or any combination thereof. Multiple functions are performed in one or more modules as desired, and the embodiments described are merely examples. A digital signal processor, ASIC, microprocessor, or any other type of processor operating on a system, such as a personal computer, server computer, supercomputing system, router, or any other device capable of processing data, including network interconnection devices, executes the software.

The software or firmware executed by the processor(s) may be stored in a storage area 210 and/or in memory 204 and typically includes an operating system 208 as well as one or more applications 218. Data 214 utilized by the software or operating system is also stored in the storage area or memory. A network adapter 212 is connected to the processor(s) 202 through the interconnect 206. The network adapter 212 provides the server 200 with the ability to communicate with remote devices, such as clients, over a network 216 and may be, for example, an Ethernet adapter.

One skilled in the art will appreciate that similar components may also be used to implement the computer 102 and the mobile device 104.

Figure 3:
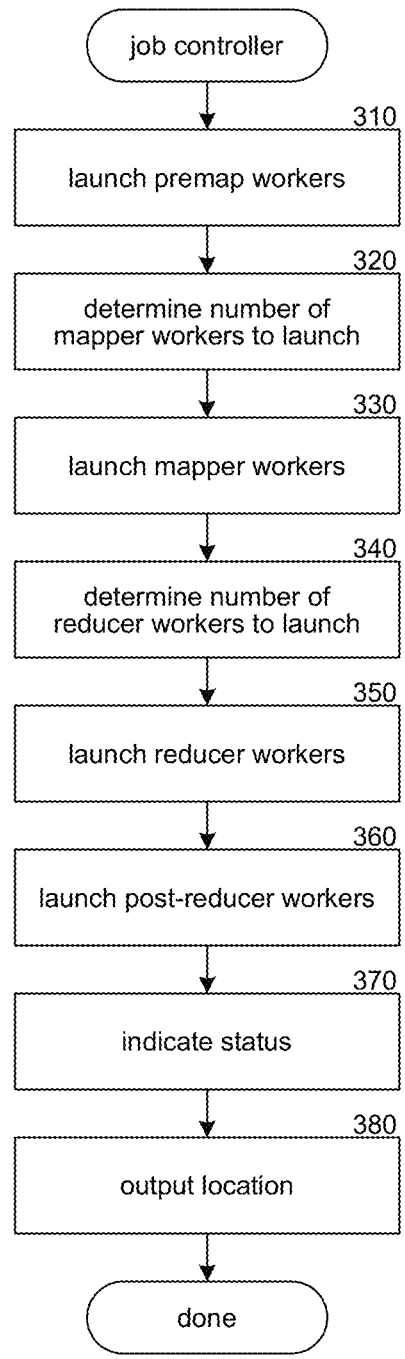
FIG. 3 is a flow diagram illustrating the processing of a job controller component in accordance with some embodiments of the disclosed technology.

FIG. 3 is a flow diagram illustrating the processing of a job controller component in accordance with some embodiments of the disclosed technology. The component is invoked within hosted execution environments to process new jobs. In in-browser execution the component is invoked by system JavaScript code in the browser, while in hosted executing environments the component is invoked by the system server. In block 310, the component launches pre-map worker (e.g., process) to copy and prepare input data of the job for the map phase and waits for the pre-map workers to complete. In block 320, the component determines the number of mapper workers to launch. In block 330, the component launches the determined number of mapper workers. Each mapper worker executes the user-provided Mapper( ) function within a shard on at least a portion of the input data. Processing of each mapper worker is further described below with reference to FIG. 4. In block 340, the component determines the number of reducer workers to launch based on, for example, the map phase output and the number of unique keys. In block 350, the component launches the determined number of reducer workers. Each reducer worker executes the user's Reducer( ) function on a subset of key-value pairs output by the mapper workers. Processing of each reducer worker is further described below with reference to FIG. 5. In block 360, the component launches post-reducer workers to format and deliver data (e.g., in accordance with user-preferred formatting and data/file type options) from the reducer workers to the user. In block 370, the component indicates the job status (e.g., executing, complete, paused) to the user. In block 380, the component indicates the output location of the data (e.g., a path to a directory on a computing device or hosted service, such as a cloud) and then completes. Those skilled in the art will appreciate that the logic illustrated in FIG. 3 and described above may be altered in a variety of ways. For example, the order of the logic may be rearranged, sublogic may be performed in parallel, illustrated logic may be omitted, other logic may be included, etc.

Figure 4:
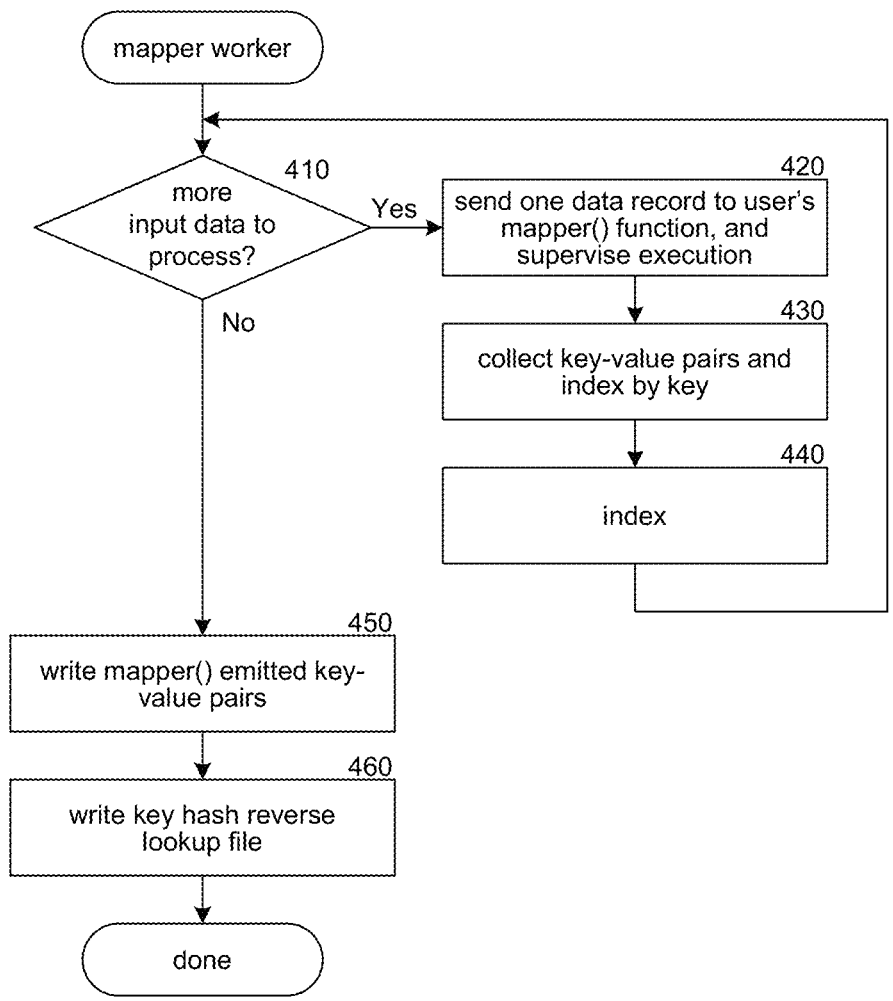
FIG. 4 is a flow diagram illustrating the processing of a mapper worker component in accordance with some embodiments of the disclosed technology.

FIG. 4 is a flow diagram illustrating the processing of a mapper worker component in accordance with some embodiments of the disclosed technology. Each mapper worker component is invoked by the job controller component to execute a user-provided Mapper( ) function on input data of the compute job. In decision block 410, if there is more input data to process then the component continues at block 420, else the component continues at block 440. In block 420, the component sends one data record of the input data to the user's Mapper( ) function and supervises execution of the user-provided Mapper( ) function. In block 430, the component collects key-value pairs emitted by the user-provided Mapper( ) function. In block 440, the component indexes the pairs by key and then loops back to block 410 to determine whether there is more input data to process. In block 450, the component writes all user-provided Mapper( ) emitted key-value pairs to storage (e.g., shared storage). In some embodiments, the key-value pairs are indexed by a hash value (e.g., SHA-1) of each unique key value prior to being written to storage. In block 460, the component writes a key hash reverse-lookup file and then completes. In this manner, the keys can be sorted without executing a typical MapReduce "Shuffle" phase. Those skilled in the art will appreciate that the logic illustrated in FIG. 4 and described above may be altered in a variety of ways. For example, the order of the logic may be rearranged, sublogic may be performed in parallel, illustrated logic may be omitted, other logic may be included, etc.

Figure 5:
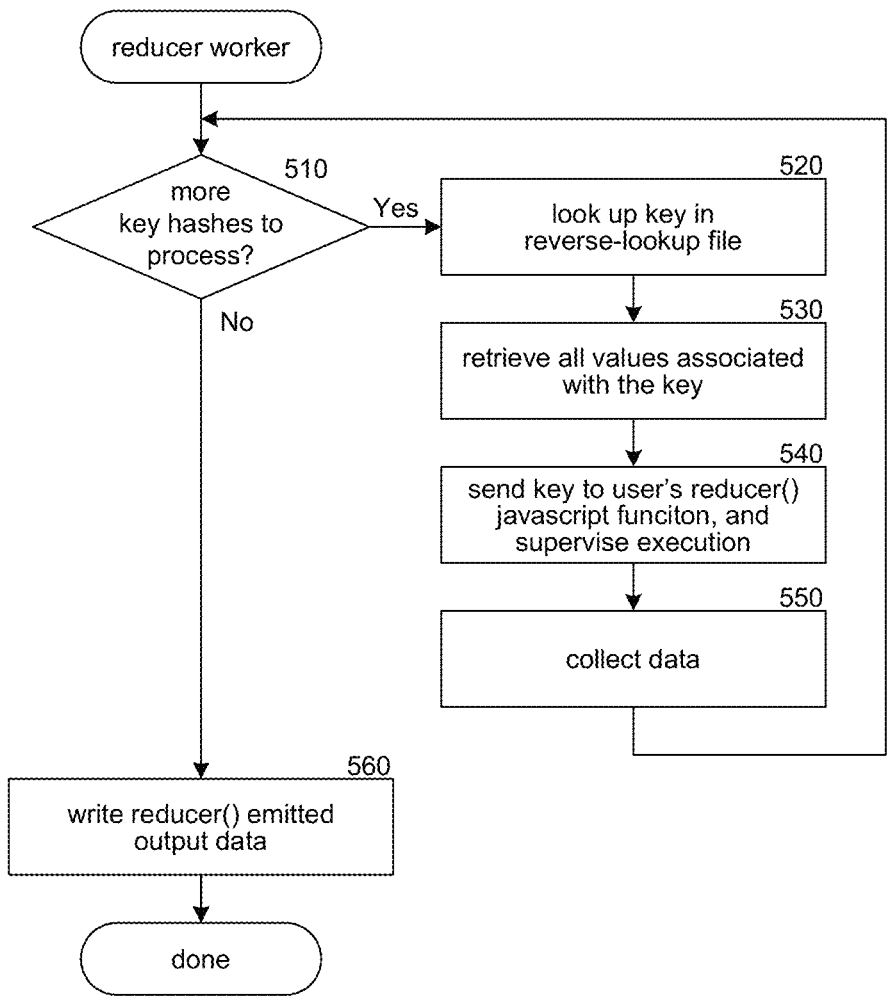
FIG. 5 is a flow diagram illustrating the processing of a reducer worker component in accordance with some embodiments of the disclosed technology.

FIG. 5 is a flow diagram illustrating the processing of a reducer worker component in accordance with some embodiments of the disclosed technology. The component is invoked by the job controller in a hosted execution environment to assign reducer workers to process key hashes. In decision block 510, if there are additional key hashes to process, then the component continues at block 520, else the component continues at block 560. In block 520, the reducer worker looks up the key corresponding to the key hash in the reverse-lookup file. In block 530, the component retrieves all values associated with the key looked up in block 520. In block 540, the component sends the key to the user's Reducer function and supervises execution of the user's Reducer function. The user's Reducer function checks for more data values via the HaveMoreValues( ) callback and retrieves each data value (which the reducer worker has ready) via the GetNextValue( ) callback. The user's Reducer function may optionally emit output data for any input. In block 550, the component collects any output data emitted by the user's Reducer function. In block 560, the component writes emitted output data to, for example, shared storage. Those skilled in the art will appreciate that the logic illustrated in FIG. 5 and described above may be altered in a variety of ways. For example, the order of the logic may be rearranged, sublogic may be performed in parallel, illustrated logic may be omitted, other logic may be included, etc.

FIG. 6 is a display page illustrating a User Interface with Local MapReduce Development and Debugging Interface in accordance with some embodiments of the disclosed technology. Display page 600 includes input data sources section 610 for identifying input data sources (e.g., "literal" input pasted in, a kernel function, a reference to stored data, and so on). Display page 600 further includes mapper function section 620 and reducer function section 630 where a user can input a mapper function and reducer function, respectively. Controls section 640 offers controls to allow a user to, for example, stop in-browser execution, step through each instruction of the in-browser executed code, reset the in-browser code, or have the code excluded elsewhere (e.g., in the cloud), and so on. Job status and debug section 650 provides feedback for the executing code (e.g., job status, the data currently being passed to a function, emitted key-value pairs, and so on) while output section 660 displays any data output by the reducer function. Those skilled in the art will appreciate that the features illustrated in FIG. 6 and described above may be altered in a variety of ways. For example, display page 600 may include additional (or fewer) sections for interacting with Mapper and Reducer functions and their corresponding input/output data.

CONCLUSION

In general, the system is directed to improved MapReduce (or related data analytic) frameworks and infrastructures that apply to user-provided Map or Reduce algorithms. Although the examples provided above generally relate to a JavaScript-based environment, one of ordinary skill in the art will recognize that other interpreted languages (e.g., Python, C#, or even compiled languages such as C, C++, or Java), which may not be interpretable natively in the browser (like JavaScript), but could employ a provided in-browser or server-proxied interpreter. In some embodiments, the disclosed techniques may employ a remoting session that provides the user experience of executing them in the browser. In some embodiments, the disclosed system includes compiled languages (such as C, C++, or Java), which may be compiled on demand or compiled explicitly, and also provides for identical local and hosted execution environments. In these embodiments, the compilation is hidden from the user and is performed at a server located remotely from the user.

The system may also include any Map-phase sorting algorithm similar to that described, for the purpose of eliminating, reducing, or optimizing the Shuffle phase.

The system may also include support for a user-supplied input data generating function, similar to the described Kernel function, in any programming language.

The system may also include support for data pipelines, ready-made data sources, ready-made compute components, and graphical programming environments over MapReduce-like compute jobs, similar to those described herein.

I claim:

1. A method, executed by one or more processors, for providing an entirely hosted MapReduce data analytic infrastructure for executing a distributed large-scale compute job, the method comprising:
   providing complete portability with respect to a programmer's local machine, operating system, and browser;
   continuously metering consumed compute, storage, and network resources on a hosting system;
   continuously reporting cost metering to a user;
   for each compute instance of the distributed large-scale compute job,
      monitoring input data and output data for the compute instance, and
      logging the input data and output data for the compute instance;
   generating input data from a kernel program, wherein the kernel program is smaller than the generated input data; and
   data-sorting at least a portion of the output data of the distributed large-scale compute job during a Map phase, wherein the data-sorting comprises,
      indexed writing of data sorting keys to shared storage by independently-executed Map jobs,
   wherein the hosted infrastructure does not require an installed client software or software development kit and wherein the hosted infrastructure does not require the compilation of computer code.

2. The method of claim 1, further comprising:
pausing the distributed large-scale compute job; and
resuming the execution of a distributed large-scale compute job, following a paused state.

3. The method of claim 1, further comprising:
use of data-sorting in the Map phase without performing a MapReduce shuffle phase.

4. The method of claim 1, further comprising:
extending a model of a transparently executing hosted first MapReduce job, to define data pipelines involving a plurality of hosted MapReduce jobs other than the first MapReduce job;

for each defined data pipeline,
creating at least one data source and compute stage, wherein each data source and compute stage is developed either by a hosting company, a user of a service, or by a third party; and
exposing a graphical programming environment.

5. The method of claim 1, further comprising:
exposing a graphical programming environment with parallelism between serial portions of the graphical programming environment.

6. A computer-readable memory storing instructions that, if executed by a computing system, cause the computing system to perform a method for providing an entirely hosted data analytic infrastructure for executing a distributed large-scale compute job, the method comprising:
providing complete portability with respect to a programmer's local machine, operating system, and browser;
continuously metering consumed compute, storage, and network resources on a hosting system;
continuously reporting cost metering to a user;
for each compute instance of the distributed large-scale compute job,
monitoring input data and output data for the compute instance, and
logging the input data and output data for the compute instance;
generating input data from a kernel program, wherein the kernel program is smaller than the generated input data; and
data-sorting at least a portion of the output data of the distributed large-scale compute job during a Map phase, wherein the data-sorting comprises,
indexed writing of data sorting keys to shared storage by independently-executed Map jobs,
wherein the hosted infrastructure does not require an installed client software or software development kit and wherein the hosted infrastructure does not require the compilation of computer code.

7. The computer-readable memory of claim 6 wherein the entirely hosted infrastructure is a MapReduce infrastructure.

8. A computing system providing an entirely hosted MapReduce data analytic infrastructure for executing a distributed large-scale compute job, the computing system comprising:
a component stored in a memory and configured to meter consumed compute resources on a hosting system;
a component configured to meter consumed storage resources on a hosting system;
a component configured to meter consumed network resources on a hosting system;
a component configured to report cost metering to a user;
a component configured to, for each compute instance of the distributed large-scale compute job,
monitor input data and output data for the compute instance, and
log input data and output data for the compute instance;
a component configured to generate input data from a kernel program; and
a component configured to sort at least a portion of the output data of the distributed large-scale compute job during a Map phase,
wherein the hosted infrastructure does not require an installed client software or software development kit and wherein the hosted infrastructure does not require the compilation of computer code.

9. The computing system of claim 8, further comprising:
a component configured to pause the distributed large-scale compute job; and
a component configured to resume the execution of the distributed large-scale compute job, following a paused state.

10. The computing system of claim 8, further comprising:
a component configured to use sorting in the Map phase without performing a MapReduce shuffle phase.

11. The computing system of claim 8, further comprising:
a component configured to extend a model of a transparently executing hosted first MapReduce job, to define data pipelines involving a plurality of hosted MapReduce jobs other than the first MapReduce job; and
a component configured to, for each defined data pipeline,
create at least one data source and compute stage, wherein each data source and compute stage is developed either by a hosting company, a user of a service, or by a third party, and
expose a graphical programming environment.

12. The computing system of claim 8, further comprising:
a component configured to expose a graphical programming environment with parallelism between serial portions of the graphical programming environment.

13. The computing system of claim 8, wherein the component configured to sort comprises a component configured to write data sorting keys to shared storage by independently-executed Map jobs.

14. The computing system of claim 8, wherein the kernel program is smaller than the generated input data.

* * * * *